US007954013B2

(12) United States Patent
Sakuramoto et al.

(10) Patent No.: US 7,954,013 B2
(45) Date of Patent: May 31, 2011

(54) STORAGE DEVICE AND PERFORMANCE MEASUREMENT METHOD FOR THE SAME

(75) Inventors: Manabu Sakuramoto, Odawara (JP); Hiroyuki Morimoto, Hiratsuka (JP); Takashi Uchiyama, Ooiso (JP)

(73) Assignee: Hitachi, Ltd., Tokyo (JP)

( * ) Notice: Subject to any disclaimer, the term of this patent is extended or adjusted under 35 U.S.C. 154(b) by 271 days.

(21) Appl. No.: 12/232,219

(22) Filed: Sep. 12, 2008

(65) Prior Publication Data
US 2009/0307534 A1 Dec. 10, 2009

(30) Foreign Application Priority Data

Jun. 5, 2008 (JP) .................................. 2008-148507

(51) Int. Cl.
*G06F 11/00* (2006.01)
(52) U.S. Cl. ........................................... 714/46; 714/42
(58) Field of Classification Search .................. 714/6–8, 714/42, 46; 709/224
See application file for complete search history.

(56) References Cited

U.S. PATENT DOCUMENTS

| | | | | |
|---|---|---|---|---|
| 5,559,958 A * | 9/1996 | Farrand et al. ................... | 714/27 |
| 5,991,897 A * | 11/1999 | Perugini et al. ................. | 714/27 |
| 7,058,953 B2 * | 6/2006 | Willard et al. .................. | 718/105 |
| 7,194,592 B2 * | 3/2007 | Sato ........................... | 711/165 |
| 7,305,379 B2 * | 12/2007 | Goyal et al. ........................ | 1/1 |
| 7,343,409 B1 * | 3/2008 | Kremer et al. ................. | 709/224 |
| 7,403,987 B1 * | 7/2008 | Marinelli et al. .............. | 709/223 |
| 7,640,258 B2 * | 12/2009 | Garcea et al. ......................... | 1/1 |
| 7,640,325 B1 * | 12/2009 | DeKoning et al. ............. | 709/223 |
| 7,689,628 B2 * | 3/2010 | Garg et al. ..................... | 707/793 |
| 7,725,776 B2 * | 5/2010 | Mikami ........................... | 714/46 |
| 7,734,718 B2 * | 6/2010 | Brown ........................... | 709/217 |
| 2004/0064552 A1 * | 4/2004 | Chong et al. ................... | 709/224 |
| 2004/0133707 A1 | 7/2004 | Yoshiya et al. | |
| 2004/0243699 A1 * | 12/2004 | Koclanes et al. ............... | 709/224 |
| 2005/0076154 A1 * | 4/2005 | Chambliss et al. ................ | 710/1 |
| 2006/0143291 A1 * | 6/2006 | Hayamatsu ..................... | 709/224 |
| 2007/0271374 A1 * | 11/2007 | Shomura et al. ................ | 709/224 |
| 2007/0283091 A1 | 12/2007 | Nagae et al. | |
| 2009/0106390 A1 * | 4/2009 | Kirwan et al. .................. | 709/217 |
| 2009/0307534 A1 * | 12/2009 | Sakuramoto et al. ............ | 714/47 |
| 2010/0094990 A1 * | 4/2010 | Ben-Yehuda et al. ......... | 709/224 |

FOREIGN PATENT DOCUMENTS

| | | |
|---|---|---|
| JP | 2002-215335 | 1/2001 |
| JP | 2004-206623 | 12/2002 |
| JP | 2007-323560 | 6/2006 |

* cited by examiner

*Primary Examiner* — Bryce P Bonzo
(74) *Attorney, Agent, or Firm* — Stites & Harbison PLLC; Juan Carlos A. Marquez, Esq.

(57) ABSTRACT

A storage system including a maintenance terminal, at least one disk drive, and a plurality of volumes that are provided by the at least one disk drive, and each store therein data written by the plurality of host devices. In this storage system, the maintenance terminal sets information for use to measure the performance of the storage device, and the storage device acquires the set information, measures the performance of the storage device with respect to the data stored in the plurality of volumes based on the information, and transmits, to the maintenance terminal, performance information about the performance being a measurement result. The storage system as such can collect information about the performance of a storage device that is not measurable from the side of the host devices, and a method for collecting such performance information can be provided.

7 Claims, 21 Drawing Sheets

FIG. 2

| CONTROL PORT NUMBER | LUN NUMBER | CAPACITY (LBA) | CLOSURE | PAIRED-STATE |
|---|---|---|---|---|
| Non | Non | 20971152 | Y | N |
| Port1 | 1-0 | 209715200 | N | N |
| Port1 | 1-1 | 125829120 | N | Y |
| Port2 | 2-0 | 125829120 | N | Y |

| TEST SET | TEST ID | READ | | | WRITE | | | SSB |
| --- | --- | --- | --- | --- | --- | --- | --- | --- |
| | | IOPS | MBPS | RESPONSE (ms) | IOPS | MBPS | RESPONSE (ms) | |
| 1 | 1 | 100 | 0.2 | 0.2 | – | – | – | – |
| 1 | 2 | 1000 | 2 | 0.4 | – | – | – | – |
| 1 | 3 | 10000 | 20 | 1 | – | – | – | – |
| 1 | 4 | 70000 | 140 | 7 | – | – | – | – |

| TEST SET | TEST ID | MEASUREMENT-TARGET PORT | MEASUREMENT-TARGET DEVICE | I/O TYPE | READ (%) | BLOCK (k, M) | START ADDRESS (k, M, G, T) | END ADDRESS (k, M, G, T) | LOAD (IOPS) | TIME (MINUTES) |
|---|---|---|---|---|---|---|---|---|---|---|
| 1 | 1 | 1A | LUN1 | random | 100 | 2k | 0k | 256k | 100 | 1 |
| 1 | 2 | 1A | LUN1 | random | 100 | 2k | 0k | 256k | 1000 | 1 |
| 1 | 3 | 1A | LUN1 | random | 100 | 2k | 0k | 256k | 10000 | 1 |
| 1 | 4 | 1A | LUN1 | random | 100 | 2k | 0k | 256k | MAX | 1 |

FIG. 6

| TEST SET | TEST ID | MEASUREMENT-TARGET PORT | MEASUREMENT-TARGET DEVICE | I/O TYPE | READ (%) | BLOCK (k, M) | START ADDRESS (k, M, G, T) | END ADDRESS (k, M, G, T) | LOAD (IOPS) | TIME (MINUTES) |
|---|---|---|---|---|---|---|---|---|---|---|
| 1 | 1 | 1A | ALL | random | 100 | 2k | | | MAX | 60 |
| 1 | 2 | 1A | ALL | sequential | 100 | 64k | | | MAX | 60 |

501

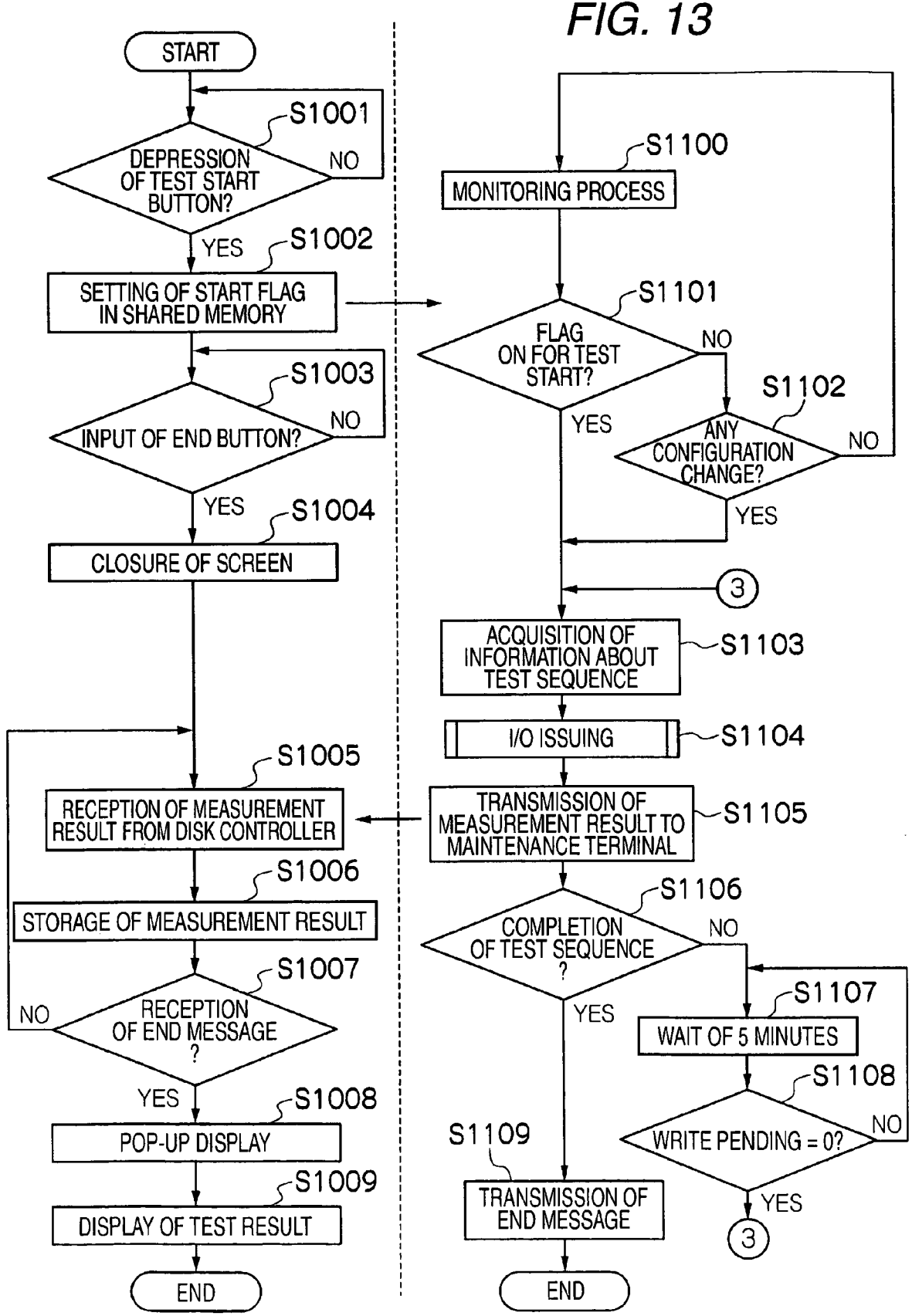

FIG. 15B

| TARGET DEVICE 710 | ADDRESS 720 | BLOCK SIZE 730 | READ/WRITE 740 | 700 |
|---|---|---|---|---|
| LUN1 | 0 | 1024 | READ | |

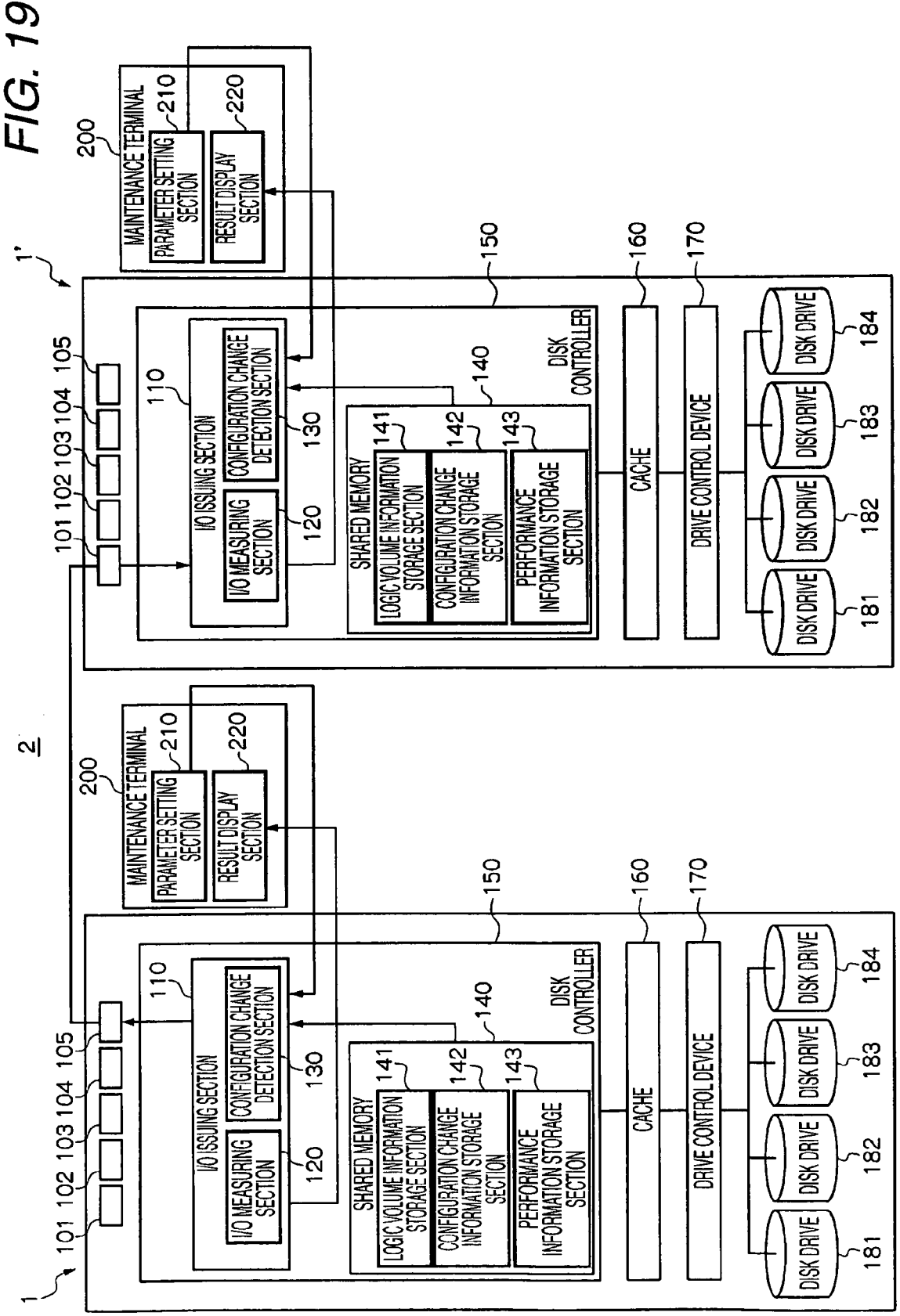

STORAGE DEVICE AND PERFORMANCE MEASUREMENT METHOD FOR THE SAME

CROSS REFERENCES TO RELATED APPLICATIONS

This application relates to and claims priority from Japanese Patent Application No. P2008-148507, field on Jun. 5, 2008, the entire disclosure of which is incorporated herein by reference.

BACKGROUND OF THE INVENTION

1. Field of the Invention

The present invention relates to a storage device and a performance measurement method for the device, and especially, is suitable when applied to a storage device written with data by a plurality of host devices, and a performance measurement method for the device.

2. Description of the Related Art

For measuring the performance of a storage device, basically needed is the function of I/O (Input/Output) issuing and measurement. For I/O issuing, there needs to designate a target device, and designate and control a load. Such designation and control are made normally on a host device. Note that a read/write command coming from the host device is executed generally on the basis of a logical volume of a storage device called LU (Logical Unit).

The storage device of a large size is designed to be connected with a plurality of host devices, and with the recent advance of technology, the LUs definable in the storage device are now larger in number than the number recognizable by a piece of host device. This thus causes a need for a plurality of host devices for measuring the performance of the storage device.

For measuring the performance in terms of specific factors, by utilizing the functions on the storage device side, i.e., monitoring and load managing, the logical volumes can be measured in its entirety all at once. The specific factors include an I/O response time, the number of I/Os, a disk occupancy rate, the number of CRC (Cyclic Redundancy Check) errors, which can be measured at fixed time intervals for each of the logical volumes. An example includes Patent Document 1 (JP-A-2007-323560). Moreover, for each of the LUs, the transfer performance and the load status can be measured in each internal bus, and a notification can be made to other components. An example includes Patent Document 2 (JP-A-2002-215335). Measuring an average I/O response time is also possible for load control in accordance with the host device I/O. An example includes Patent Document 3 (JP-A-2004-206623).

The issue here is that a software package operating on the host devices has a recognition limit for the number of LUs, and thus a large number of LUs cannot be measured all at once. Another issue is that, even if a plurality of host devices individually perform the load measurement with respect to the LUs, the measurement environment will not be the same because the host devices each have their own hardware and software environment. As such, collectively measuring a large number of LUs in the storage device is considered significant. Moreover, due to the varying path lengths from each of the host devices to the storage device, the measurement performed on the side of the host devices resultantly includes not only the operating load of the host devices but also the communications load, thereby failing to be accurate.

SUMMARY OF THE INVENTION

The invention is proposed in consideration of the problems as above, and an object thereof is to provide a storage system that collects information about the performance of a storage device that is not measurable from the side of host devices, and a method for collecting such performance information.

A first aspect of the invention is directed to a storage system including a storage device, a maintenance terminal for maintenance use of the storage device, and a plurality of host devices with respect to the storage device. In the storage system, the maintenance terminal includes a setting section that sets information for use to measure performance of the storage device. The storage device includes: at least one disk drive; a plurality of volumes that are provided by the at least one disk drive, and each store therein data written by the plurality of host devices; a measurement section that acquires the information set by the setting section, and based on the information, measures the performance of the storage device with respect to the data stored in the plurality of volumes; and a transmission section that transmits, to the maintenance terminal, performance information about the performance being a measurement result by the measurement section.

Such a configuration favorably enables, with an exemplary setting for volume-basis load measurement, to measure the number and capacity of volumes that cannot be recognized from the side of the host devices. With specification of volume, the load may be changed on a volume basis for measurement. This thus enables to perform measurement by the maintenance terminal in accordance with any configuration change made in the storage device.

A second aspect of the invention is directed to a storage system including a storage device, a maintenance terminal for maintenance use of the storage device, and a plurality of host devices with respect to the storage device. In the storage system, the maintenance terminal includes a setting section that sets information for use to measure performance of the storage device. The storage device includes: at least one disk drive; a plurality of volumes that are provided by the at least one disk drive, and each store therein data written by the plurality of host devices; a detection section that detects any change made to information about a configuration of the storage system; a measurement section that acquires, when the change of the configuration information is detected by the detection section, the information set by the setting section, and based on the information, measures the performance of the storage device with respect to the data stored in the plurality of volumes; and a transmission section that transmits, to the maintenance terminal, performance information about the performance being a measurement result by the measurement section.

With such a configuration, when a microprogram in the storage device is changed in configuration, e.g., version update, the storage device can detect the change and start the measurement of performance. When any of the volumes in the storage device is paired with any volume in another storage device, the storage device can also detect the change and start the measurement of performance.

According to the aspects of the invention, provided are a storage system that collects information about the performance of a storage device that is not measurable from the side of host devices, and a method for collecting such performance information.

BRIEF DESCRIPTION OF THE DRAWINGS

FIG. 2 is a diagram for illustrating logical volume information stored in a logical volume information storage section of the embodiment;

FIG. 4 is a diagram showing exemplary performance information to be stored in a performance information storage section of the embodiment;

FIG. 5 is a diagram showing an exemplary table set with default parameters of the embodiment;

FIG. 6 is a diagram showing an exemplary table set with user-designated parameters of the embodiment;

FIG. 13 is a flowchart showing a process of performance measurement in its entirety of the embodiment;

FIG. 15B is a diagram showing command execution parameters of the embodiment;

FIG. 19 is a diagram showing a modified example of the configuration of the storage system of the embodiment.

DESCRIPTION OF THE PREFERRED EMBODIMENT

First Embodiment

Figure 1:
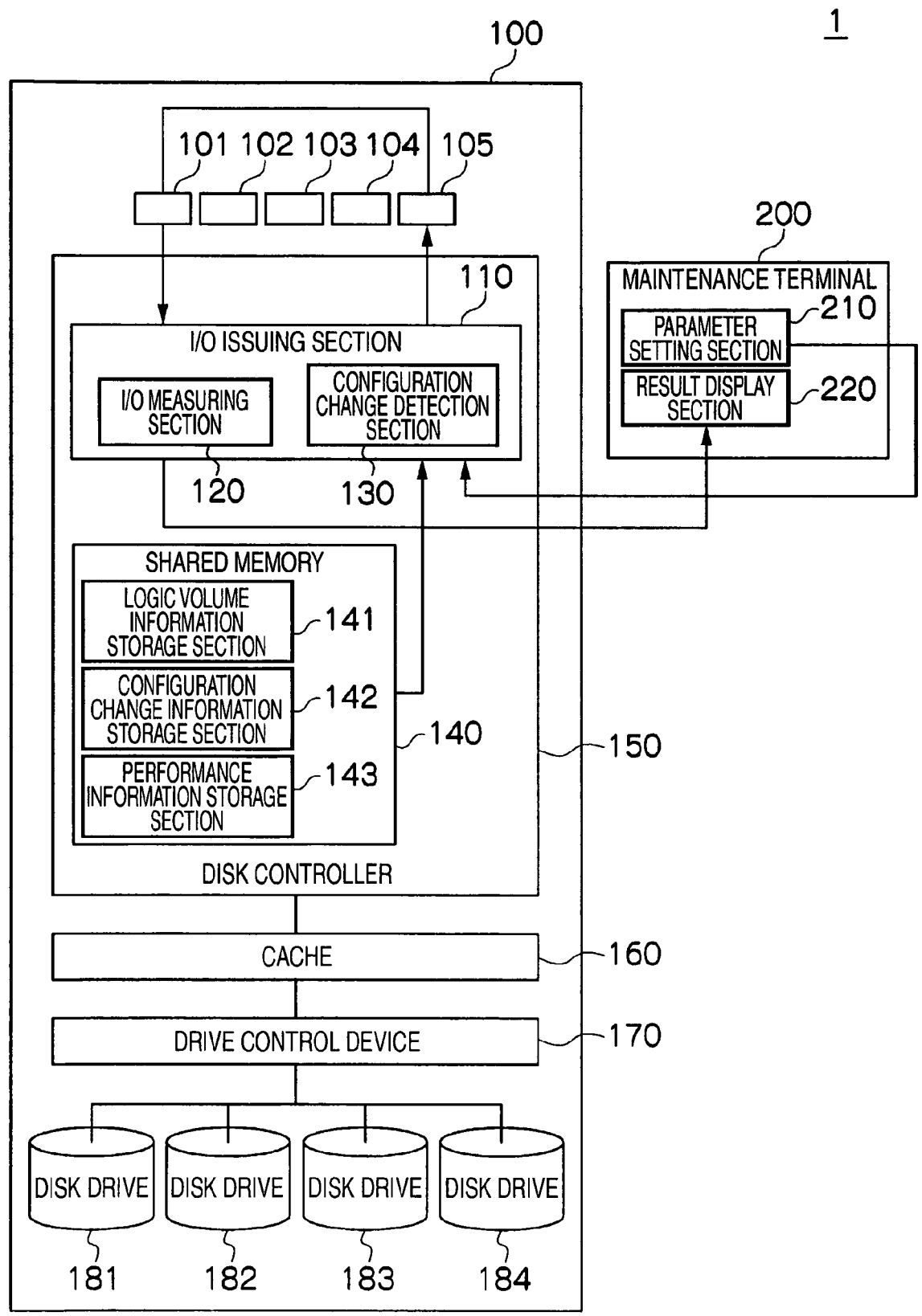
FIG. 1 is a diagram showing the configuration of a storage system of an embodiment of the invention.

FIG. 1 is a block diagram showing the configuration of a storage system 1. As shown in FIG. 1, the storage system 1 includes a storage device 100, and a maintenance terminal 200. The storage device 100 is provided for storage of data, and the maintenance terminal 200 is provided for maintenance use of the storage device 100.

The storage device 100 is configured to include fiber ports 101 to 105, a disk controller 150, a cache 160, a drive control device 170, and disk drives 181 to 184.

The disk controller 150 writes data to the disk drives 181 to 184 or reads data therefrom based on a command coming from a plurality of host devices (not shown as are of general type). Control application over such data writing/reading is not described as is common. Based on a command coming from the maintenance terminal 200, the disk controller 150 is in charge of not only processing such as configuration setting and change of volumes provided by the disk drives 181 to 188 but also performance measurement of the storage device 100. The processing of this performance measurement will be described later.

The cache 160 is provided for storage of data on a temporary basis at the time of data writing by the disk controller 150 to the disk drives 181 to 184. The cache 160 also serves for storage of data on a temporary basis at the time of data reading by the disk controller 150 from the disk drives 181 to 184.

The drive control device 170 controls data writing or reading to/from the disk drives 181 to 184. The disk drives 181 to 184 each store therein the data.

The disk controller 150 includes an I/O issuing section 110, and a shared memory 140. The I/O issuing section 110 issues a command for performance measurement of the storage device 100. This I/O issuing section 110 includes an I/O measurement section 120, and a configuration change detection section 130. Based on the command issued by the I/O issuing section, the I/O measurement section 120 measures the performance of the storage device 100, e.g., data read/write performance. The configuration change detection section 130 detects any configuration change made in the storage device 100, e.g., any configuration change of volumes provided by the disk drives 181 to 184, any change of parity groups, and any version update of a microprogram stored in the disk controller 150. Such detection is performed by referring to information about any configuration change made in the storage device 100. This information is the one stored in a predetermined memory of the storage device 100 when any configuration change is made.

The shared memory 140 includes a logical volume information storage section 141, a configuration change information storage section 142, and a performance information storage section 143. The logical volume information storage section 141 stores logical volume information about logical volumes. The configuration change information storage section 142 stores configuration change information about any configuration change made in the storage device 100, e.g., any configuration change of volumes provided by the disk drives 181 to 184 (e.g., paired or eliminated), any change of parity groups, and any version update of a microprogram stored in the disk controller 150. The performance information storage section 143 stores a result of measurement of performance information. Note that the performance information stored in the performance information storage section 143 is transmitted to the storage device 100 at a timing that will be described later.

The maintenance terminal 200 includes a parameter setting section 210, and a result display section 220. The maintenance terminal 200 sets parameters for use with performance measurement, and is provided with a display device (not shown) for display of the measurement result. Based on the display of the display device, a user operates the maintenance terminal.

The parameter setting section 210 sets parameters for use with performance measurement of the storage device 100. The parameters set by the parameter setting section 210 as such are stored in the parameter setting section 210. Note that the parameter setting section 210 stores therein also the setting of default parameters. The result display section 220 displays thereon the result of the performance measurement of the storage device 100. The details of the parameters and the measurement result will be described later.

FIG. 2 is a diagram for illustrating logical volume information to be stored in the logical volume information storage section 141. As shown in FIG. 2, such logical volume information 300 is configured to include a control fiber port number field 310, a LUN (Logical Unit Number) field 320, a capacity field 330, a closure field 340, and a paired-state field 350.

The control fiber port number field 310 stores the numbers of fiber ports for use to control the logical volumes. The LUN (Logical Unit Number) field 320 stores the numbers of the logical volumes. The capacity field 330 stores the capacities of the logical volumes. The closure field 340 stores information about whether the logical volumes are each closed or not. The paired-state field 350 stores information about whether the logical volumes are each paired with another or not.

As exemplary storage contents, the control fiber port number field 310 displays "Non", the LUN (Logical Unit Number) field 320 displays "Non", the capacity field 330 displays "2097152", the closure field 340 displays "Y(YES)", and the paired-state field 350 displays "N(NO)".

Figure 3:
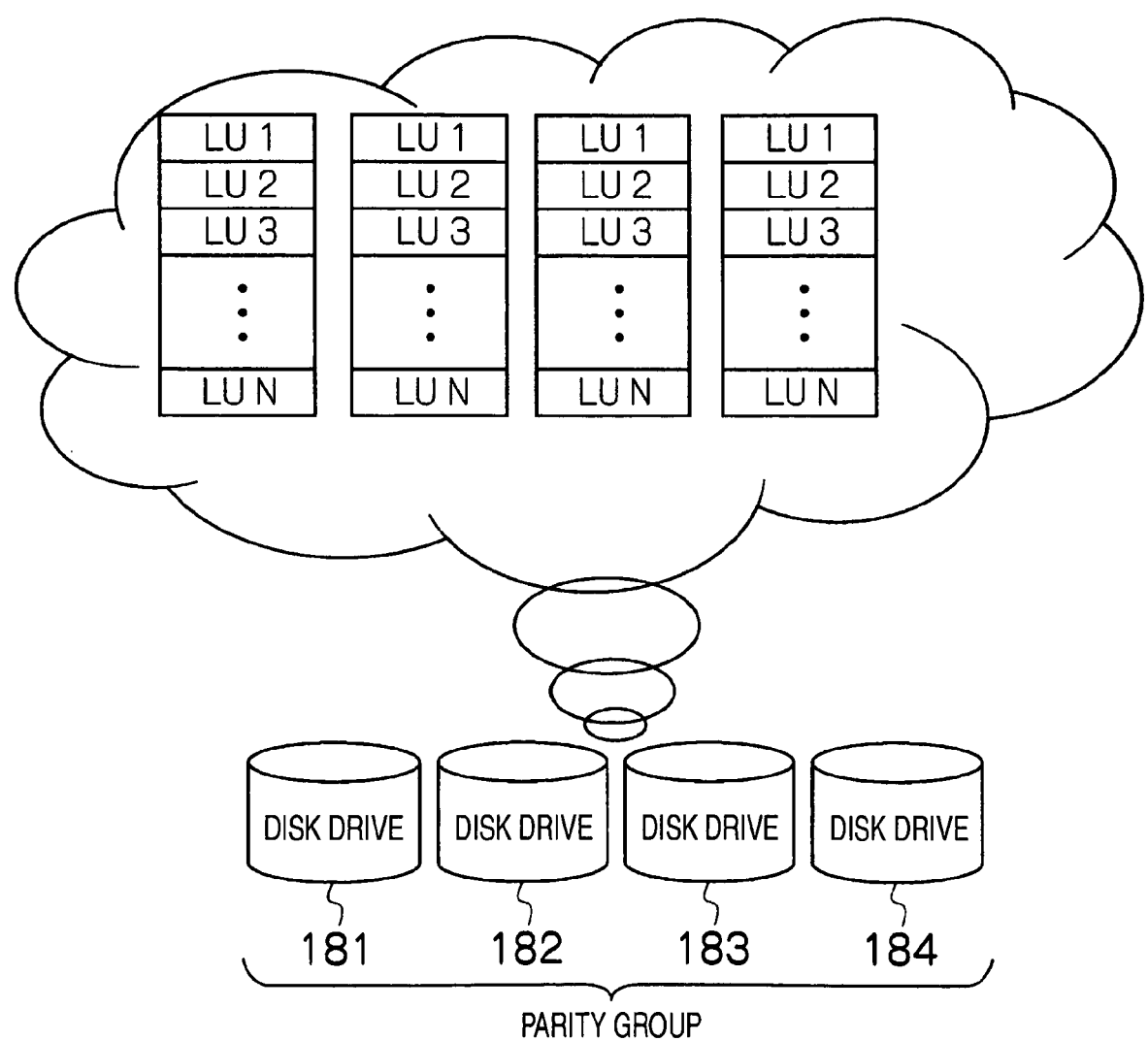
FIG. 3 is a diagram for illustrating a parity group of the embodiment.

FIG. 3 is a diagram for illustrating a parity group. The parity group is configured by a plurality of disk drives for keeping data reliable. As shown in FIG. 3, the disk drives 181 to 184 configure one parity group, for example.

FIG. 4 is a diagram showing exemplary performance information 400 to be stored in the performance information storage section 143. The performance information 400 is configured to include a test set field 410, a test ID (Identification) field 420, a read field 430, a write field 440, and an SSB (Serial Split Brain) field 450. These fields respectively store test sets, test IDs, Read (IOPS: I/O Per Sec, MBPS: Mega Byte Per Sec, and response), Write (IOPS, MBPS, and response), and SSBs. The read field 430 includes an IOPS field 431, an MBPS field 432, and a response field 433, and the write field 440 includes an IOPS field 441, an MBPS field 442, and a response field 443.

FIGS. 5 and 6 are each a table showing the setting of parameters. FIG. 5 shows an exemplary table with default parameters, and FIG. 6 shows an exemplary table with user-designated parameters.

FIG. 5 is a table showing setting of default parameters. This table 500 is configured by a test set field 510, a test ID field 520, a measurement-target fiber port field 530, a measurement-target device (logical volume) field 540, an I/O type field 550, a Read field 560, a Block field 570, a start address field 580, an end address field 590, a load field 591, and a time field 592. These fields are for the setting of test set, test ID, measurement-target fiber port, measurement-target device (logical volume), I/O type, Read, Block, start address, end address, load, and time.

The test set field 510 stores numbers each indicate a test set. The test ID field 520 stores numbers each indicate a test ID. The measurement-target fiber port field 530 stores numbers of fiber ports each being a measurement target. The measurement-target device (logical volume) field 540 stores numbers with which logical volumes each being a measurement target are designated. The I/O type field 550 stores I/O type such as "random". The Read field 560 stores information indicating the proportion of read commands among all commands during a predetermined length of time. The Block field 570 stores numbers with which reading data is specified by Block. The start address field 580 stores addresses indicating the start position of each of the Blocks. The end address field 590 stores addresses indicating the end position of each of the Blocks. The load field 591 stores information indicating the frequency of I/Os per second, i.e., IOPS. The time field 592 stores information about a measurement time in units of minutes.

As exemplary storage contents, the table 500 displays the test set "1", the test ID "1", the measurement-target fiber port "1A", the measurement-target device "LUN (Logical Unit Number) 1", the I/O type "random", the Read "100", the Block "2k", the start address "0k", the end address "256k", the load "100", and the time "1".

FIG. 6 is a table 501 indicating the setting of user-designated parameters. Such a setting of user-designated parameters is provided by the maintenance terminal 200, for example.

This table 501 is configured by, similarly to the table 500, the test set field 510, the test ID field 520, the measurement-target fiber port field 530, the measurement-target device (logical volume) field 540, the I/O type field 550, the Read field 560, the Block field 570, the start address field 580, the end address field 590, the load field 591, and the time field 592. These fields are for the setting of test set, test ID, measurement-target fiber port, measurement-target device (logical volume), I/O type, Read, Block, start address, end address, load, and time. These fields are the same as those of the table 500, and thus are not described twice.

As exemplary storage contents, the table 501 displays the test set "1", the test ID "1", the measurement-target fiber port "1A", the measurement-target device "ALL", the I/O type "sequential", the Read "100", the Block "2k", the load "MAX", and the time "60". Herein, because every logical volume is the measurement target, and thus the field of start address and that of end address are both blank.

Figure 7:
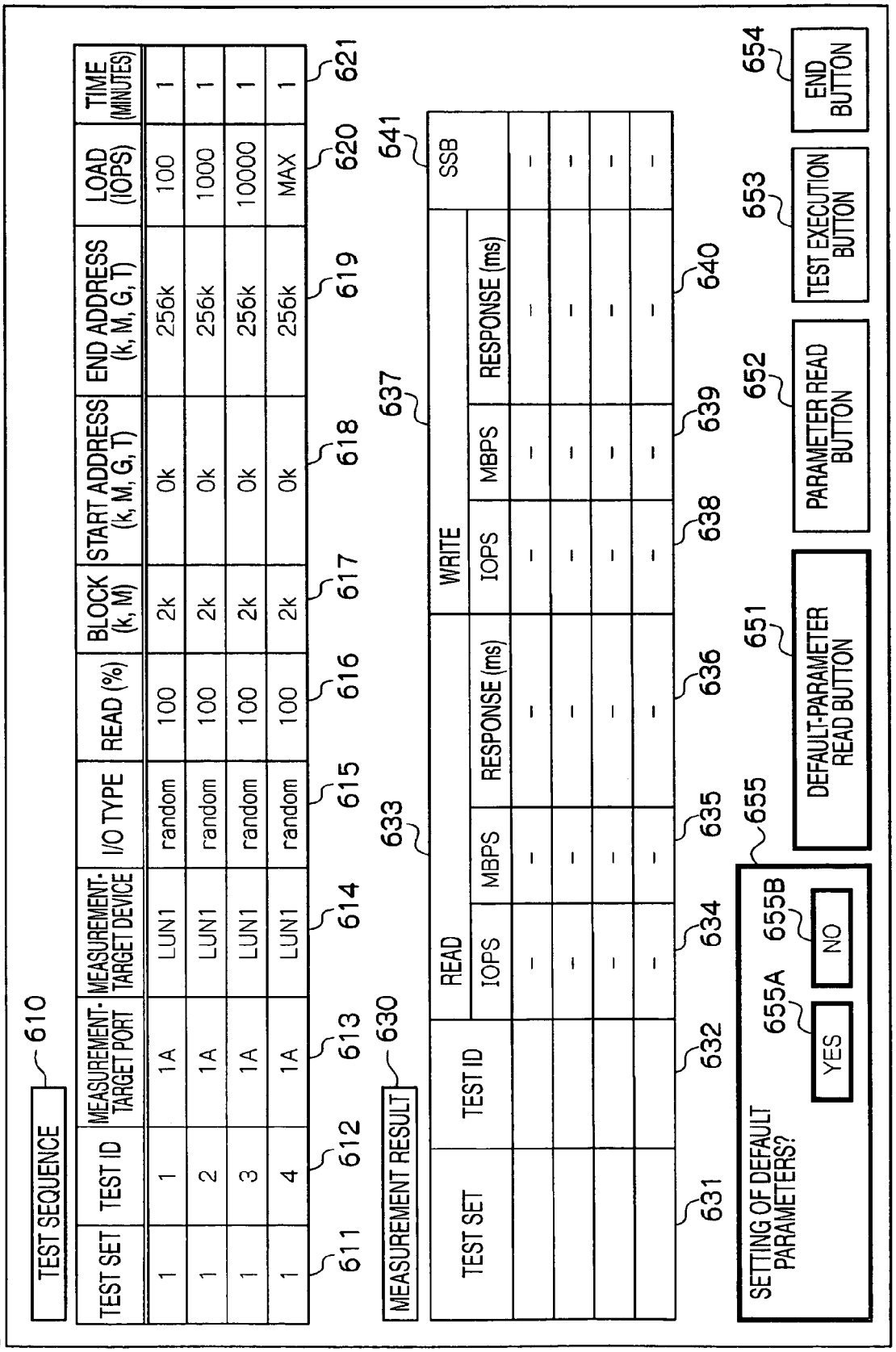
FIG. 7 is a diagram showing an exemplary screen of a maintenance terminal of the embodiment.

FIG. 7 is a diagram showing a screen 600 of the maintenance terminal 200 when performance measurement of the storage device 100 is performed with default parameters.

The screen 600 includes a test sequence field 610, and a measurement result field 630. The test sequence field 610 is provided for display of test sequence, and the measurement result field 630 is provided for display of measurement results. Below these fields, provided are a default parameter setting section 655, a default parameter read button 651, a parameter read button 652, a test execution button 653, and an end button 654.

The test sequence field 610 is configured by a test set field 611, a test ID field 612, a measurement-target fiber port field 613, a measurement-target device (logical volume) field 614, an I/O type field 615, a Read field 616, a Block field 617, a start address field 618, an end address field 619, a load field 620, and a time field 621. These fields are for the setting of test set, test ID, measurement-target fiber port, measurement-target device (logical volume), I/O type, Read, Block, start address, end address, load, and time. These fields are corresponding to the storage contents of the table 500 described above.

The default parameter setting section 655 is displayed popped up with a user input of the default parameter read button 651. The default parameter setting section 655 is provided with a YES button 655A and a NO button 655B together with a message of "Setting of Default Parameters?". When wanting to continue the performance measurement of the storage device 100 with the default parameters, the user inputs the YES button 655A. In response, as shown in FIG. 7, the test sequence field 610 displays the default parameters, which are described by referring to FIG. 5.

Figure 8:
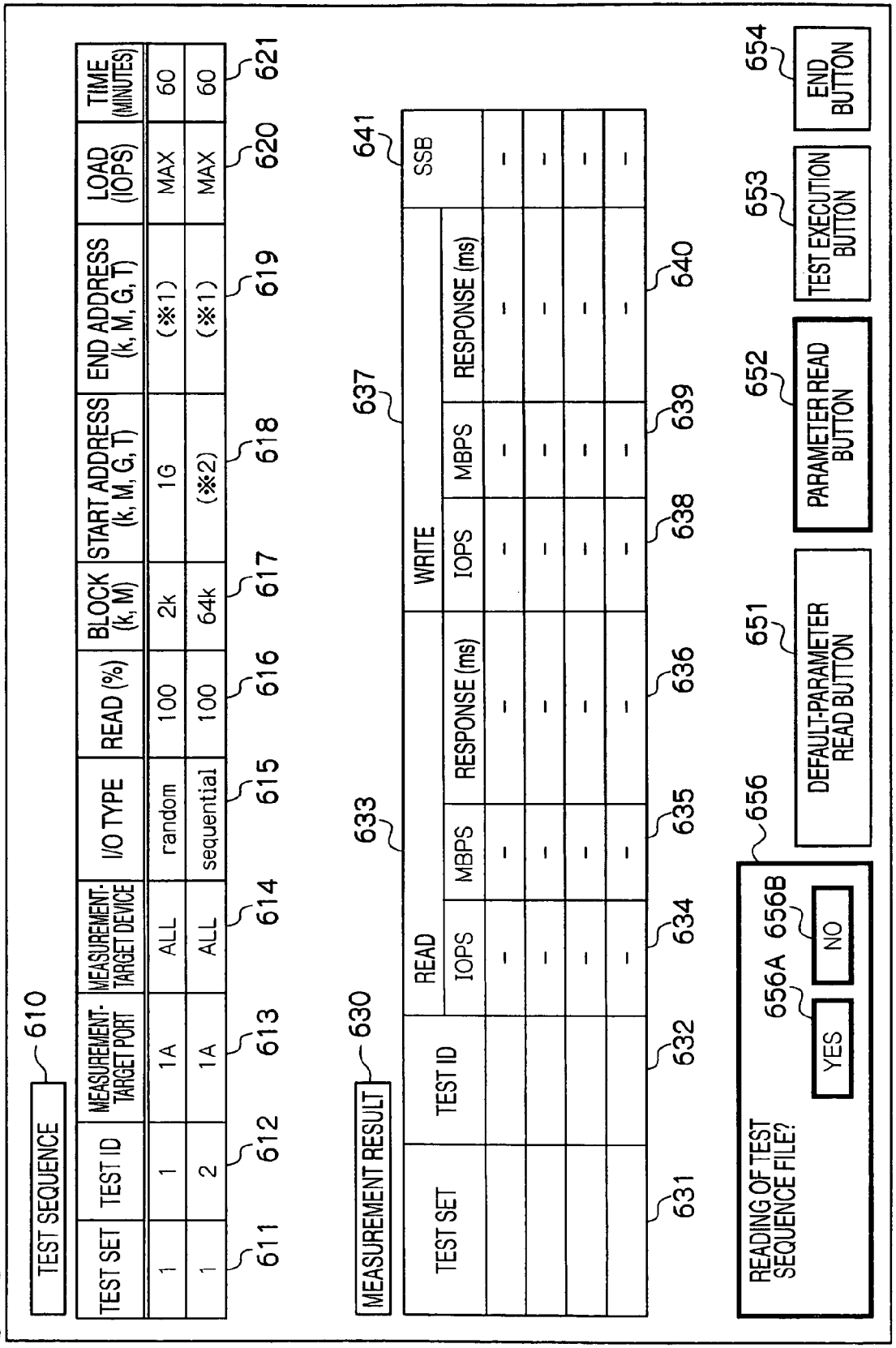
FIG. 8 is a diagram showing another exemplary screen of the maintenance terminal of the embodiment.

FIG. 8 is a diagram showing a screen 601 of the maintenance terminal 200 when the performance measurement of the storage device 100 is performed with user-designated parameters.

Similarly to the case of FIG. 7, the screen 601 includes the test sequence 610 for display of test sequence, and the measurement result field 630 for display of measurement results. Below these fields, provided are -a user parameter setting section 656, the default parameter read button 651, the parameter read button 652, the test execution button 653, and the end button 654.

The user parameter setting section 656 is displayed popped up with a user input of the parameter read button 652. The user parameter setting section 656 is provided with a YES button 656A and a NO button 656B together with a message of "Reading of Test Sequence File?". When wanting to continue the performance measurement of the storage device 100 with the user-designated parameters, the user inputs the YES button 656A. In response, as shown in FIG. 8, the test sequence field 610 displays the user-designated parameters, which are described by referring to FIG. 6.

Figure 9:
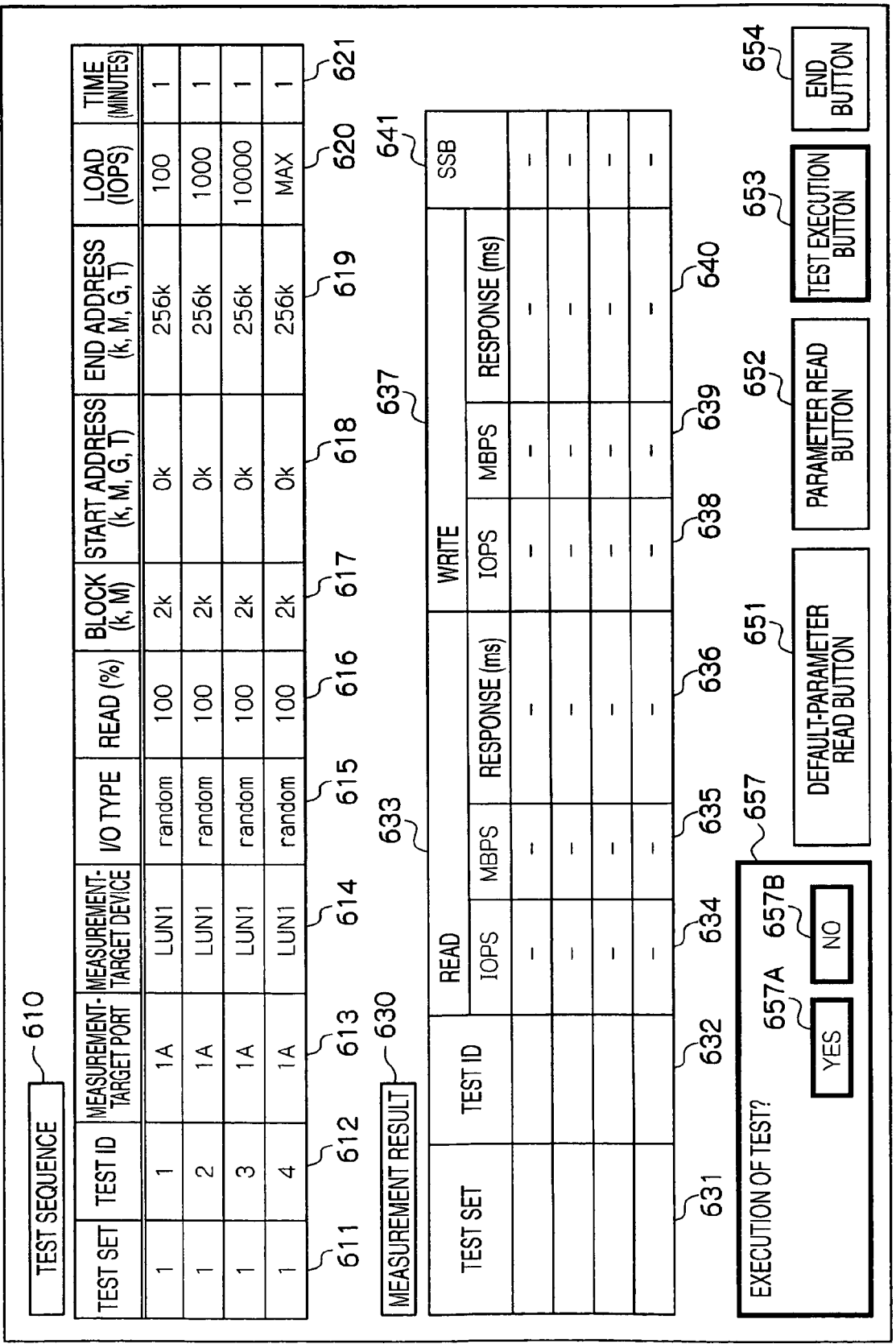
FIG. 9 is a diagram showing still another exemplary screen of the maintenance terminal of the embodiment.

FIG. 9 is a diagram showing a screen 602 with a user input of the test execution button 653 after the setting of the default parameters in FIG. 7.

With a user input of the test execution button 653, as shown in FIG. 9, the test execution section 657 is displayed popped up. The test execution section 657 displays a YES button 657A and a NO button 657B together with a message of "Execution of Test?". With an input of the YES button 657A, a flag is set for test execution with the default parameters, and a command is transmitted to the storage device 100 for starting test execution. With a user input of the end button 654 afterward, the screen 602 displayed on the maintenance terminal 200 is closed.

Note that, with an input of the NO button 657B, the input of the test execution button 653 is cancelled. For text execution by the user with the user-designated parameters, the user makes an input of the parameter read button 651. For ending the test, the user makes an input of the end button 654.

After the setting of the user-designated parameters in FIG. 8, when the user inputs the test execution button 653, the screen 601 displays the same as above except that the test sequence field 610 displays the user-designated parameters.

Figure 10:
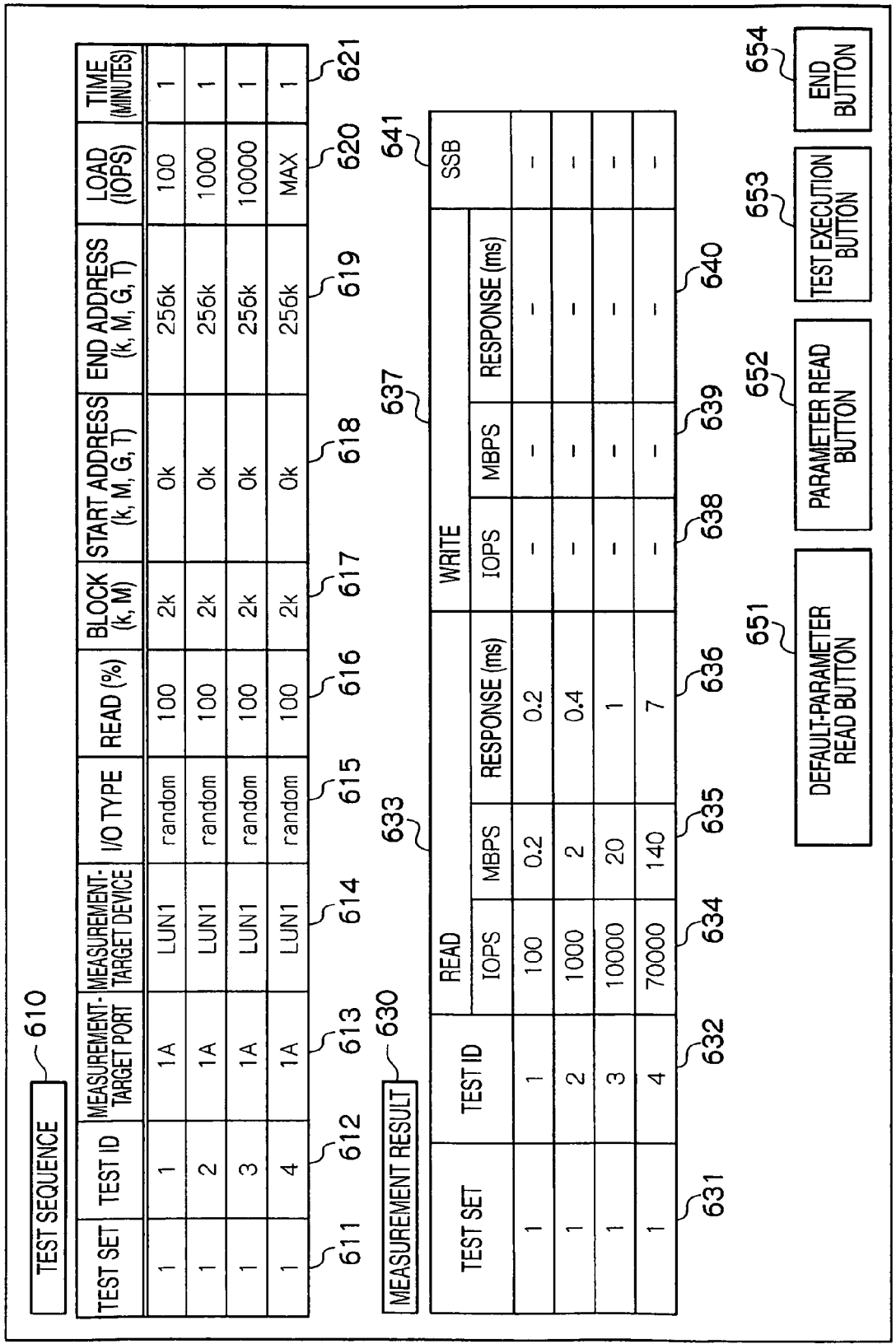
FIG. 10 is a diagram showing still another exemplary screen of the maintenance terminal of the embodiment.

FIG. 10 is a diagram showing a screen 603 of the maintenance terminal 200 displaying the result of performance measurement of the storage device 100 using the default parameters. When the performance measurement of the storage device 100 is completed, information indicating as such is displayed popped up on the maintenance terminal 200. By the user operation based on the display of information, this screen 603 is displayed.

The measurement result field 630 displays the measurement result. The measurement result field 630 is configured by a test set field 631, a test ID field 632, a read field 633, a write field 637, and an SSB field 641. These fields are for the display of test set, test ID, Read (IOPS, MBPS, and response), Write (IOPS, MBPS, and response), and SSB. The read field 633 includes an IOPS field 634, an MBPS field 635, and a response field 636. The write field 637 includes an IOPS field 638, an MBPS field 639, and a response field 640. These fields are corresponding to the performance information described by referring to FIG. 4.

The test set field 631 and the test ID field 632 display the same numbers as those with the default parameters. In the fields in the read field 633, i.e., the IOPS field 634, the MBPS field 635, and the response field 636, respectively displayed are IOPS, MBPS, and response. Note here that, with the default setting, no measurement is performed with respect to the write performance and the SSB performance, and thus the write fields 673 and the SSB field 641 are both blank.

As exemplary storage contents, the measurement result field 630 displays the test set "1", the test ID "1", the IOPS "100", the MBPS "0.2", and the response "0.2".

Described next is a process for the performance measurement of the storage device 100 described above.

Figure 11:
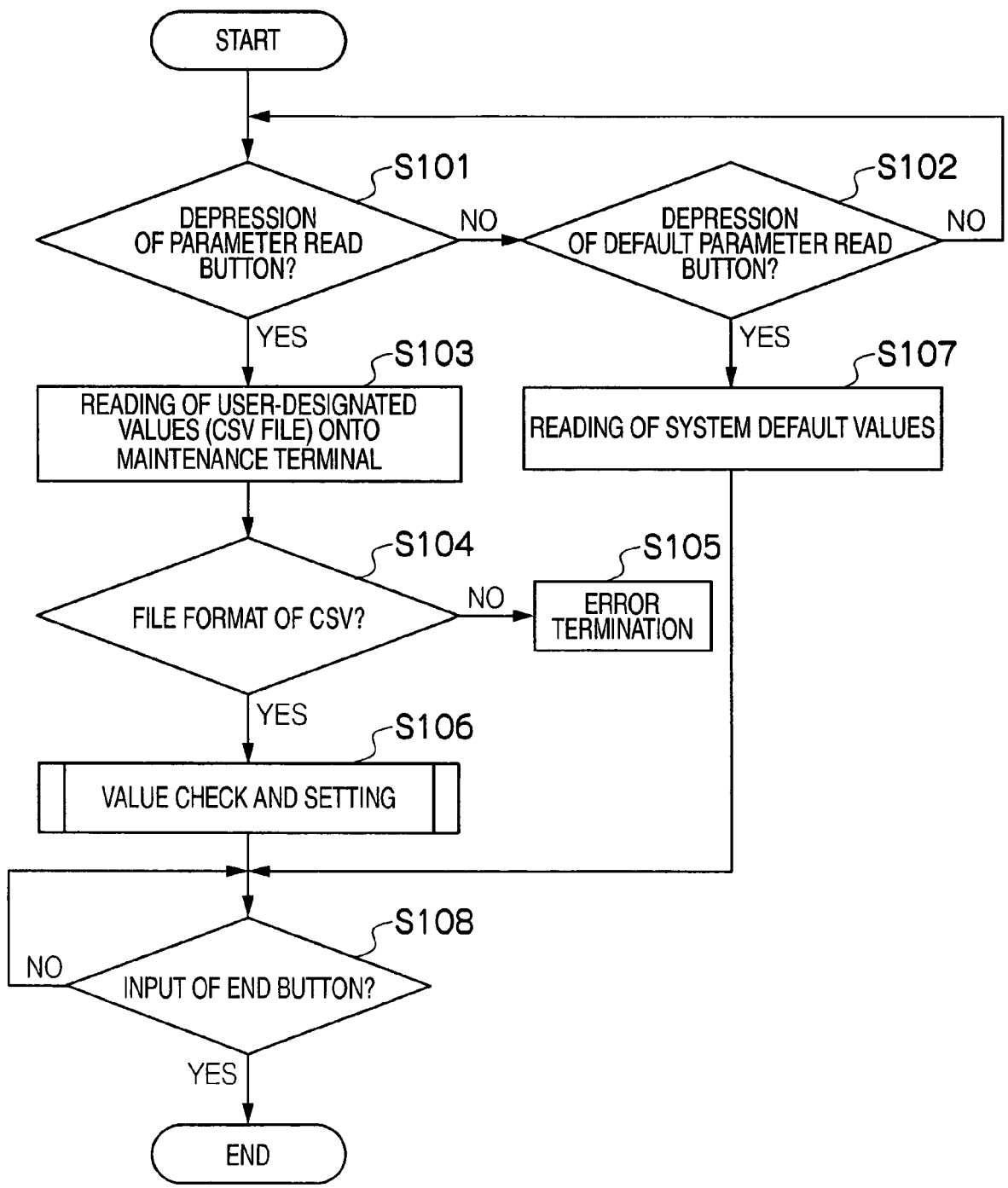
FIG. 11 is a flowchart of a process of reading the parameter setting of the embodiment.

FIG. 11 is a flowchart of a process for the maintenance terminal 200 to read the parameter setting of the storage device 100 when the maintenance terminal 200 performs the performance measurement of the storage device 100 through user operation.

In step S101, a determination is made whether an input of the parameter read button 652 is made or not. When the determination is made that no input of the parameter read button 652 is made (S101: NO), then in step S102, another determination is made whether an input of the default parameter read button 651 is made or not.

When the determination is made that the input of the parameter read button 652 is made (S101: YES), then in step S103, the user-designated parameters (CSV file) set in the table 501 are read. Then in step S104, a determination is made about the file format, i.e., CSV file format or not. When the determination is made that the file format is not CSV (S104: NO), the procedure goes to step S105, i.e., error termination. On the other hand, when the file format is determined as being CSV, a process of value check and setting is executed in step S106. The details of the process in step S106 will be described later. As a result, as described by referring to FIG. 8, for example, the user-designated parameters are displayed in the test sequence field 610.

When the determination is made that the input of the default parameter read button 651 is made (S102: YES), in step S107, the setting values of the default parameters are read. As a result, as described by referring to FIG. 7, for example, the default parameters are displayed in the test sequence field 610.

When the parameters are displayed in the test sequence field 610 in steps S106 and S107, in step S108, a determination is made whether an input of the end button 654 is made or not. When the determination is made that the input of the end button 654 is made (S108: YES), this is the end of the process.

Figure 12A:
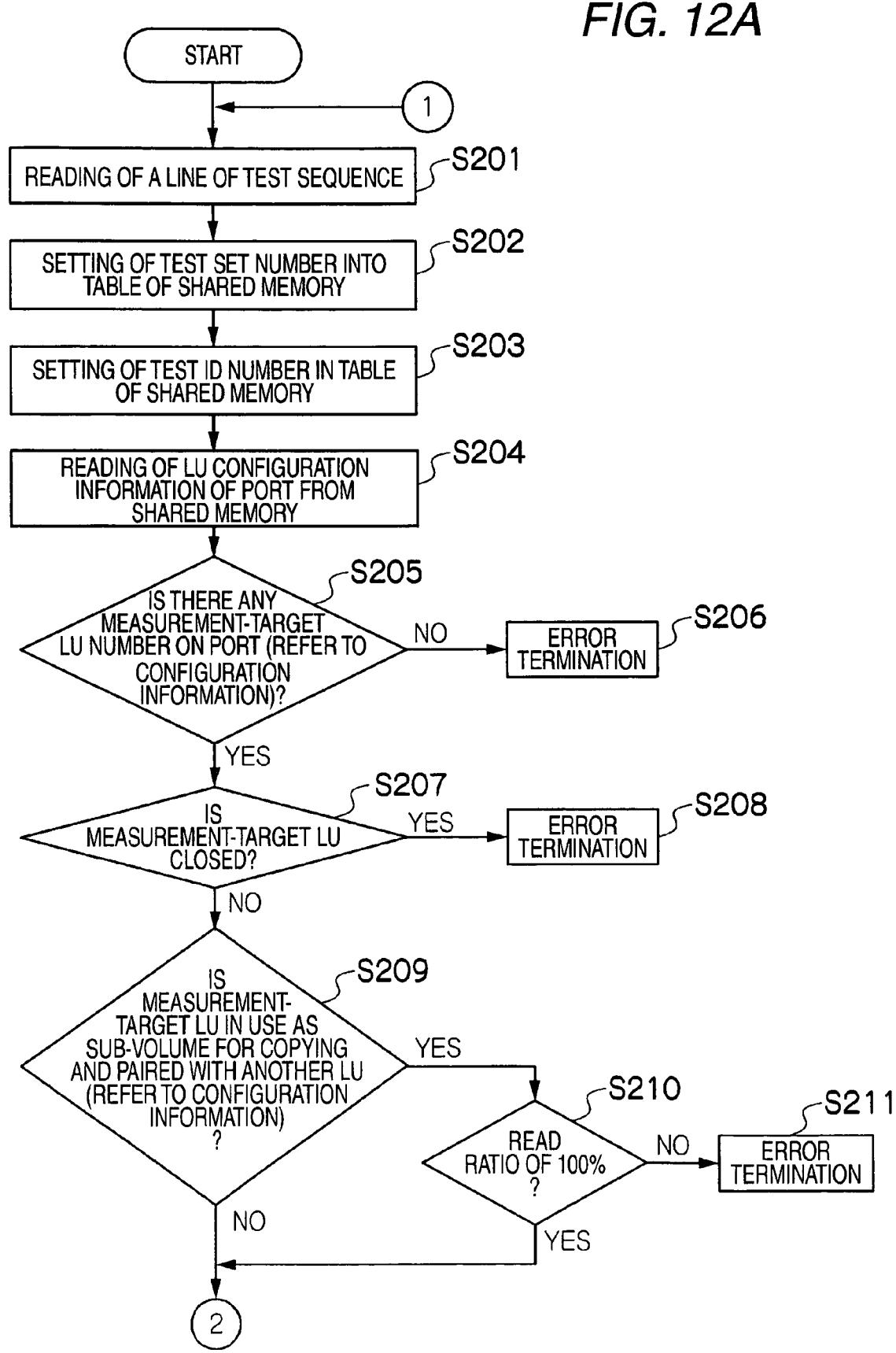
FIG. 12A is a first half of a flowchart of a value check and setting process of the embodiment.
Figure 12B:
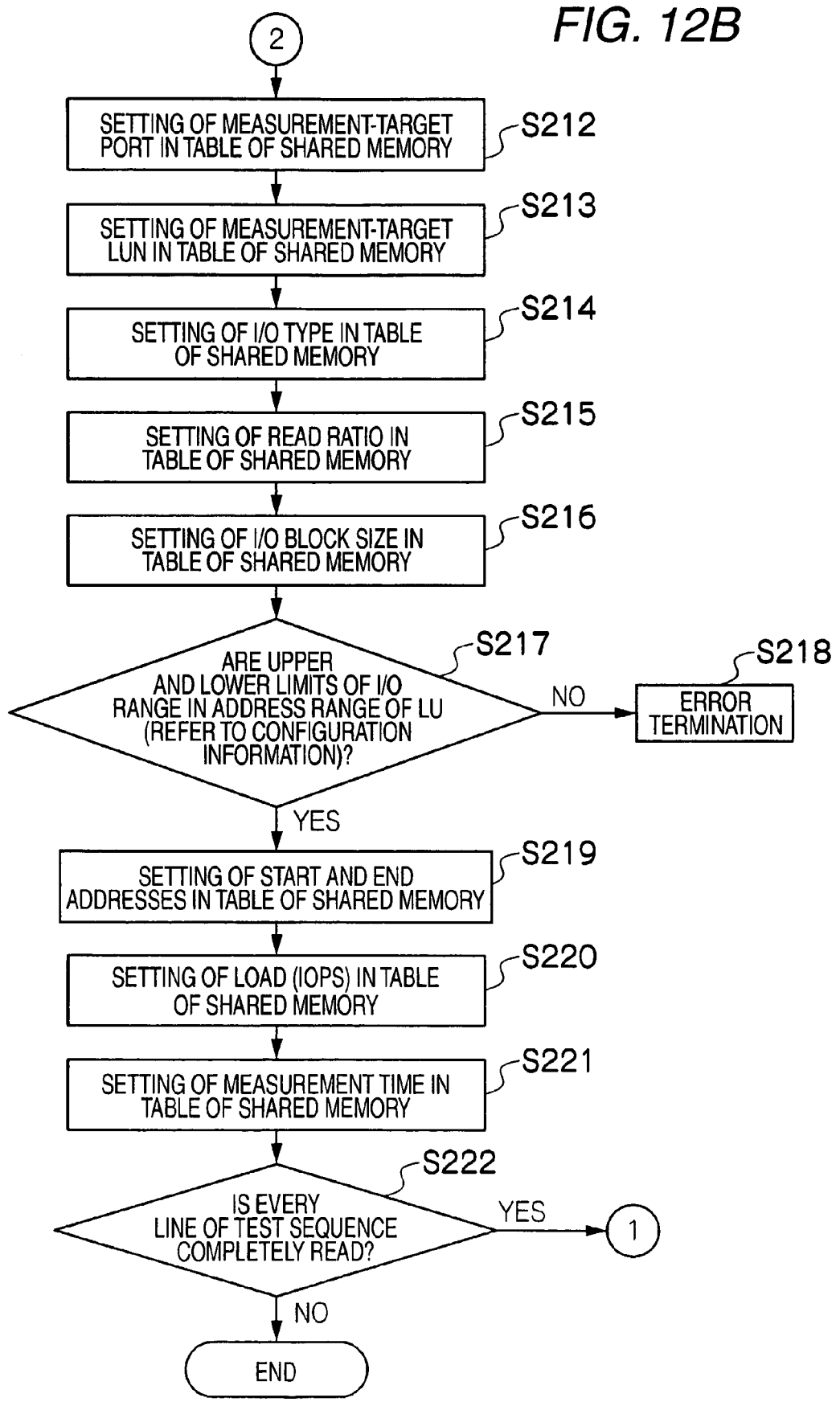
FIG. 12B is a second half of the flowchart of the value check and setting process of the embodiment.

FIGS. 12A and 12B are each a detailed flowchart of the value check and setting process in step S106.

First of all, in step S201, a line of the test sequence is read. In step S202, a test set number is set in the table of the shared memory 140, and in step S203, a test ID number is set in the table of the shared memory 140. In step S204, LU configuration information of any corresponding fiber port is read from the shared memory 140.

Then in step S205, the configuration information is referred to, and a determination is made whether the measurement-target LU number is found on the fiber port. If the number is not found (S205: NO), this process is terminated in error in step S206. If the number is found (S205: YES), in step S206, the configuration information is referred to, and a determination is made whether the LU is in the closed state or not. If the LU is in the closed state (S207: YES) this process is terminated in error in step S208.

On the other hand, when the LU is not in the closed state (S207: NO), in step S209, the configuration information is referred to, and a determination is made whether the LU is being used as a sub-volume for copying, for example, and whether the LU is being paired with another or not. With the determination result of YES in step S209, then in step S210, a determination is made whether the read ratio is 100% or not. With the determination of NO in step S210, this process is terminated in error in step S211.

With the determination result of YES in step S209, or with the determination result of YES in step S210, various settings are made in the table of the shared memory 140 in a sequential manner, i.e., the measurement-target fiber port is set in step S212, the measurement-target LUN is set in step S213, the I/O type is set in step S214, the read ratio is set in step S215, and the I/O block size is set in step S216.

Then in step S217, the configuration information is referred to, and a determination is made whether the upper and lower limits of the I/O range are within the address range of the LU or not. If the upper and lower limits are not in the address range of the LU (S217: YES), this process is terminated in error in step S218.

When the upper and lower limits are in the address range of the LU (S217: NO), then in step S219, the start address and the end address are both set in the table of the shared memory 140, and the procedure goes to step S220. Then in step S220, the load (IOPS) is set in the table of the shared memory 140, and then in step S221, the measurement time is set in the table of the shared memory 140.

Then in step S222, a determination is made whether every line of the test sequence is completely read or not, and when not every line is yet completely read (S222: NO), the procedure returns to step S201. When every line is completely read (S222: YES), this is the end of the process.

FIG. 13 is a flowchart of a process in its entirety for the performance measurement of the storage device 100 from the side of the maintenance terminal 200. In FIG. 13, the process steps on the left side, i.e., S1001 to S1009, are those to be executed by the maintenance terminal 200, and the process steps on the right side, i.e., S1101 to S1109, are those to be executed by the storage device 100.

In step S1001, when a test start button displayed on the screen is determined as being depressed, in step S1002, a start flag is set in the shared memory 140. With this flag set as such, the maintenance terminal 200 starts the process of measuring the performance of the storage device 100, and a command is transmitted from the maintenance terminal 200 to the storage device 100 for starting the performance measurement.

Then in step S1003, a determination is made whether an end button is input or not. When the end button is determined as being input, the procedure then goes to step S1004, and the screen for the performance measurement is closed.

Then in step S1005, when the measurement result comes from the storage device 100 for every test ID, the measurement result is stored in step S1006. Then in step S1007, a determination is made whether an end message is received or not. When no end message is received (S1007: NO), the procedure returns to step S1005. Herein, the end message is the one provided by the storage device 100 after the measurement result of every test ID is transmitted.

When the end message is received (S1007: YES), the procedure goes to step S1008, and a pop-up display is made on the screen to tell that the end message is received. With such a pop-up display, the user can visually perceive that the performance measurement is completed.

Thereafter, when the user goes through an operation of starting the screen for display of the result of the performance measurement, the test result is displayed on the screen 603 in step S1009 as described by referring to FIG. 10. This enables the user to check the measurement result.

In the storage device 100, a process of monitoring commands coming from the maintenance terminal 200 is always executed in step S1100. In this monitoring process, a determination is made whether the test start flag is ON in step S1101 or not, and in step S1102, a determination is made whether any configuration change is made or not.

The determination in step S1101 is made based on the reception of command, i.e., whether a command is provided or not from the maintenance terminal 200 indicating that the test start flag is set. The determination in step S1102 is made based on whether a microprogram is updated in version, and whether any change is observed in the information about the LUs, specifically, paired or eliminated. Such information about any version update or configuration information of the LUs are stored in a predetermined memory in the storage device 100 as described above.

When the flag is determined as being ON (S1101: YES), or when a determination is made that any configuration change is made (S1102: YES), the information about the test sequence is acquired from the table of the shared memory 140 in step S1103. Then in step S1104, the I/O issuing process is executed for every test ID for performance measurement. The details of the I/O issuing process will be left for later description.

Then in step S1105, the measurement result corresponding to one test ID as a result of step S1104 is forwarded to the maintenance terminal 200. Then in step S1106, a determination is made whether the test sequence is completely through or not.

When the test sequence is not yet completely through (S1106: NO), after a five-minute wait in step S1107, a determination is made whether write pending is 0 or not in step S1108. When the write pending is not 0 (S1108: NO), the procedure returns to step S1107. When the write pending is 0 (S1108: YES), the procedure returns to the process of S1103. Thereafter, the process for the next test ID is executed.

Note here that the write pending is data temporarily stored in the cache 160 not reflected to the disk drives 181 to 184. As long as the write pending data is left in the cache 160, the writing to the disk drives 181 to 184 is continuously made, whereby the measurement fails to be accurate. Therefore, the processes of steps S1107 and S1108 are executed.

On the other hand, when the test sequence is completely through in step S1106 (S1106: YES), an end message is forwarded to the maintenance terminal 200 in step S1109.

Note that exemplified above is the case of forwarding the result of performance measurement to the storage device 100 on a test ID basis. This is surely not restrictive, and alternatively, the measurement result may be stored for every test ID in the shared memory 140 of the storage device 100, and when the test sequence is completely through, the result of the performance of the test set may be forwarded to the storage device 100 together with an end message.

Figure 14:
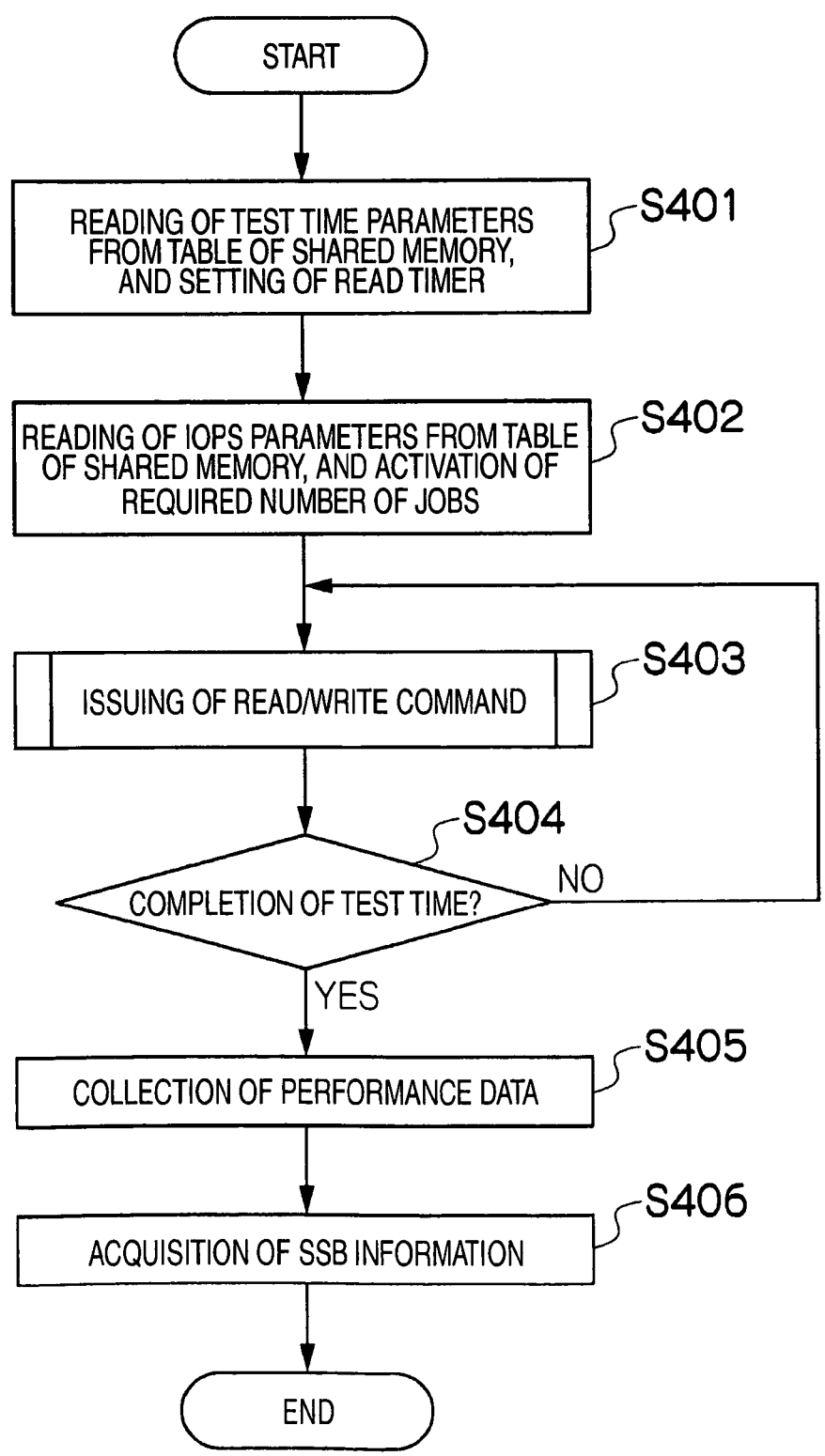
FIG. 14 is a flowchart of an I/O issuing process of the embodiment.

FIG. 14 is a flowchart of the I/O issuing process. In step S401, test-time parameters are read from the table of the shared memory 140, and a timer is then set. Then in step S402, IOPS parameters are read from the table of the shared memory 140, and the required number of IOBs is activated. Then in step S403, a read/write command issuing process is executed. The details of this read/write command issuing process will be described later.

Then in step S404, a determination is made whether the test time is through or not. When the test time is not yet through (S404: NO), the procedure returns to step S403. When the test time is through (S404: YES), the performance data is collected in step S405.

For collecting the performance data, the values of counters from the performance measurement routine are used, i.e., a read I/O counter (RC), a write I/O counter (WC), a read I/O response counter (RR), and a write I/O response counter (WR). To be specific, the values of the counters include an average read IOPS=RC/test time (s), an average write IOPS=WC/test time (s), an average read MBPS=RC*block size (MB)/test time (s), an average write MBPS=WC*block size (MB)/test time (s), an average read response=RR/test time (ms), and an average read response=WR/test time (ms).

Then in step S406, an SSB (disk log information) is acquired.

Figure 15A:
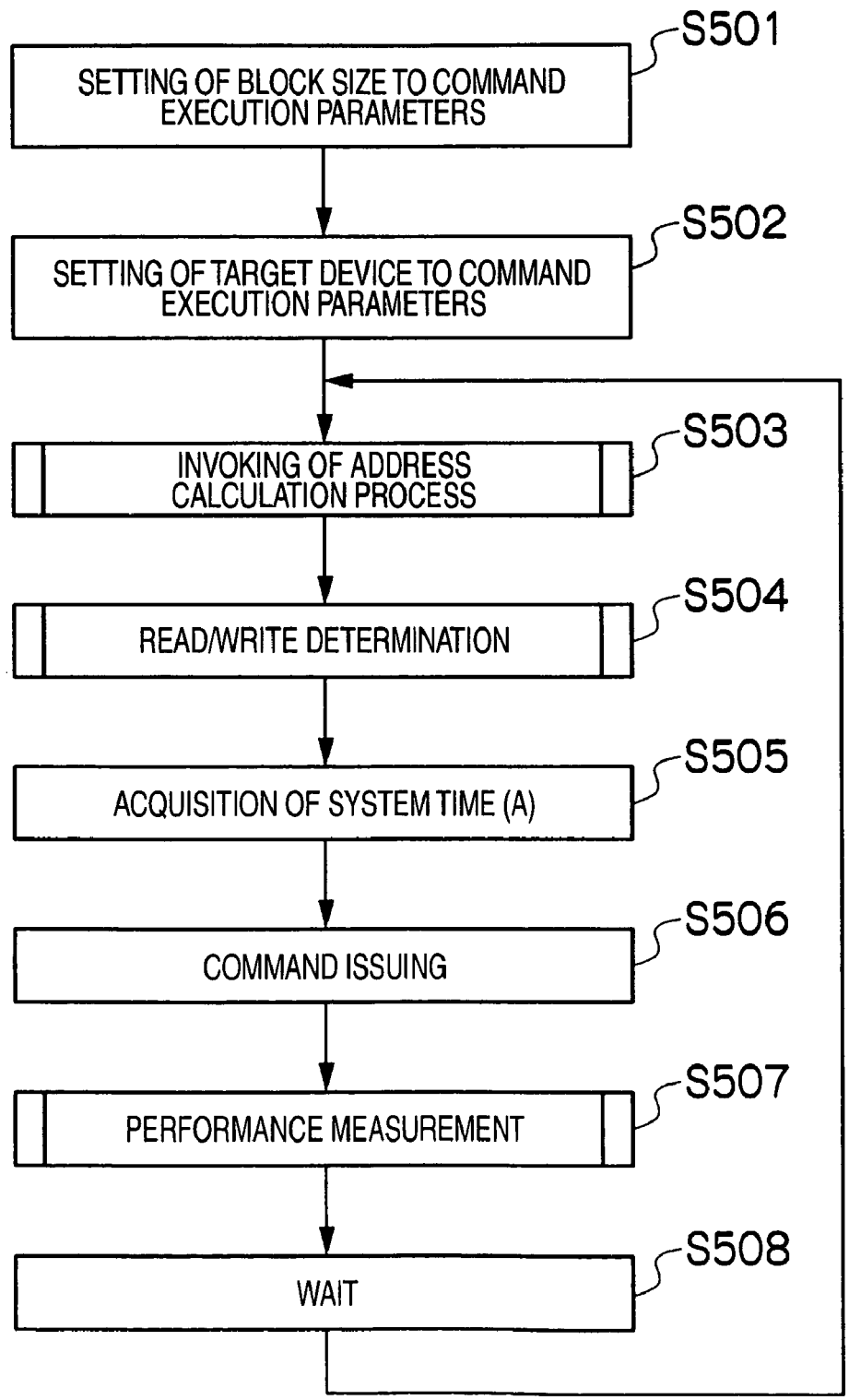
FIG. 15A is a flowchart of a read/write command issuing process of the embodiment.

FIG. 15A is a flowchart of the read/write command issuing process in step S403.

In step S501, a block size is set to the command execution parameters, and in step S502, a target device is set to the command execution parameters. FIG. 15B is a diagram showing exemplary command execution parameters. These command execution parameters 700 include a target device field 710, an address field 720, a block size 730, and a read/write field 740, and with an exemplary parameter setting, these fields respectively display LUN1, 0, 1024, and Read.

In step S503, an address calculation process is invoked, and in step S504, a read/write determination process is executed. The details of these processes, i.e., the address calculation process in step S503 and the read/write determination process in step S504, will be described later.

A system time (A) is acquired in step S505, a command is issued in step S506, and the performance measurement is performed in step S507. The performance measurement process in step S507 will be described later. Then in step S508, after a wait of fixed length of time for load adjustment, the procedure returns to step S503.

Figure 16:
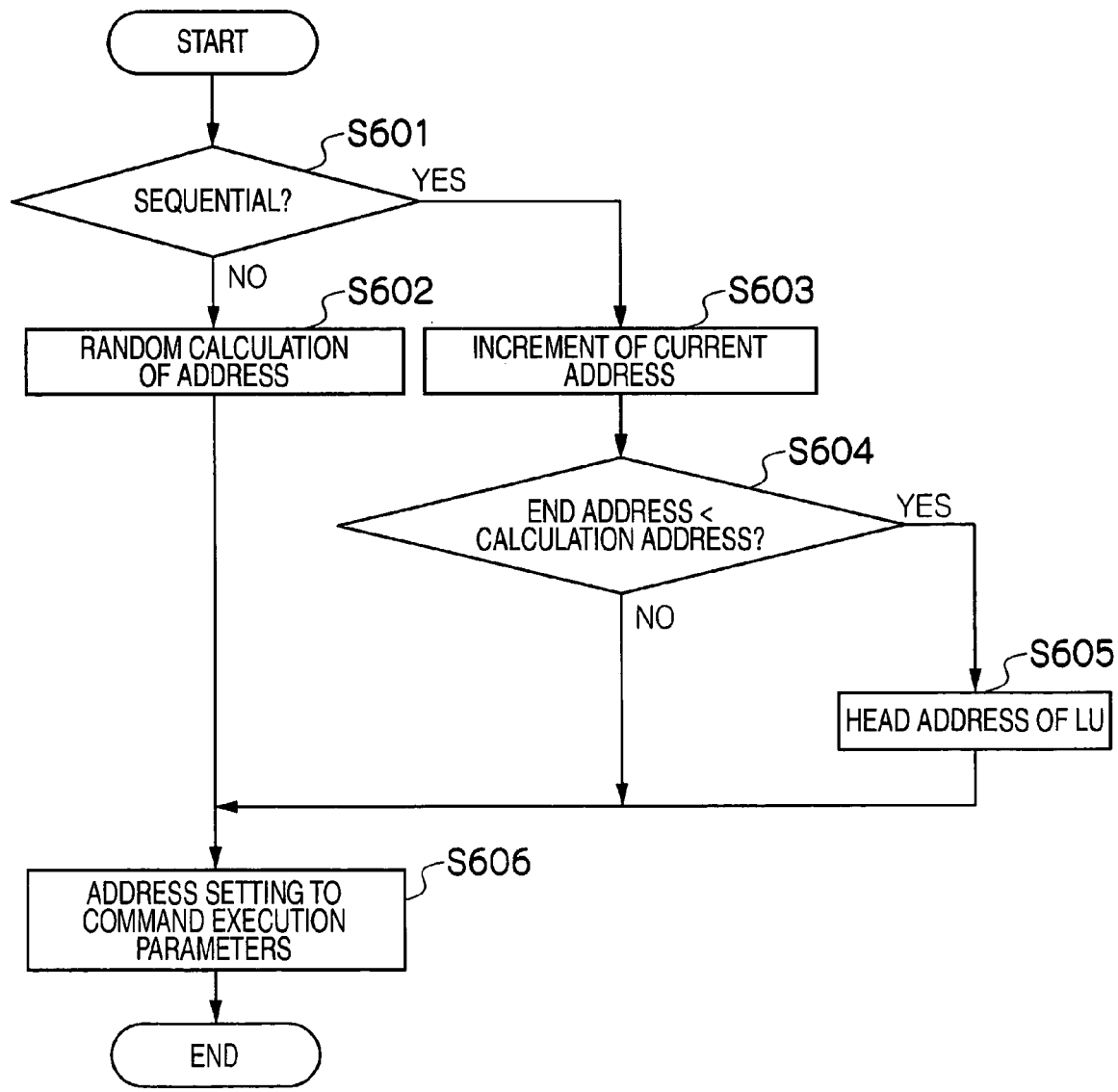
FIG. 16 is a flowchart of an address process of the embodiment.

FIG. 16 is a flowchart of the address process in step S503. In step S601, a determination is made whether it is sequential or not. When it is not sequential (S601: NO), the random calculation of address is performed in step S602.

When it is sequential (S602: YES), the current address is incremented in step S603, and then in step S604, a determination is made whether "end address<calculation address (incremented address)". When the determination result is YES in step S604, the head of the calculated address is regarded as the head address of the LU in step S605.

When the process in step S602 is completed, when the process in step S605 is completed, and when the determination result is NO in step S604, the command execution parameters are set with addresses in step S606.

Figure 17:
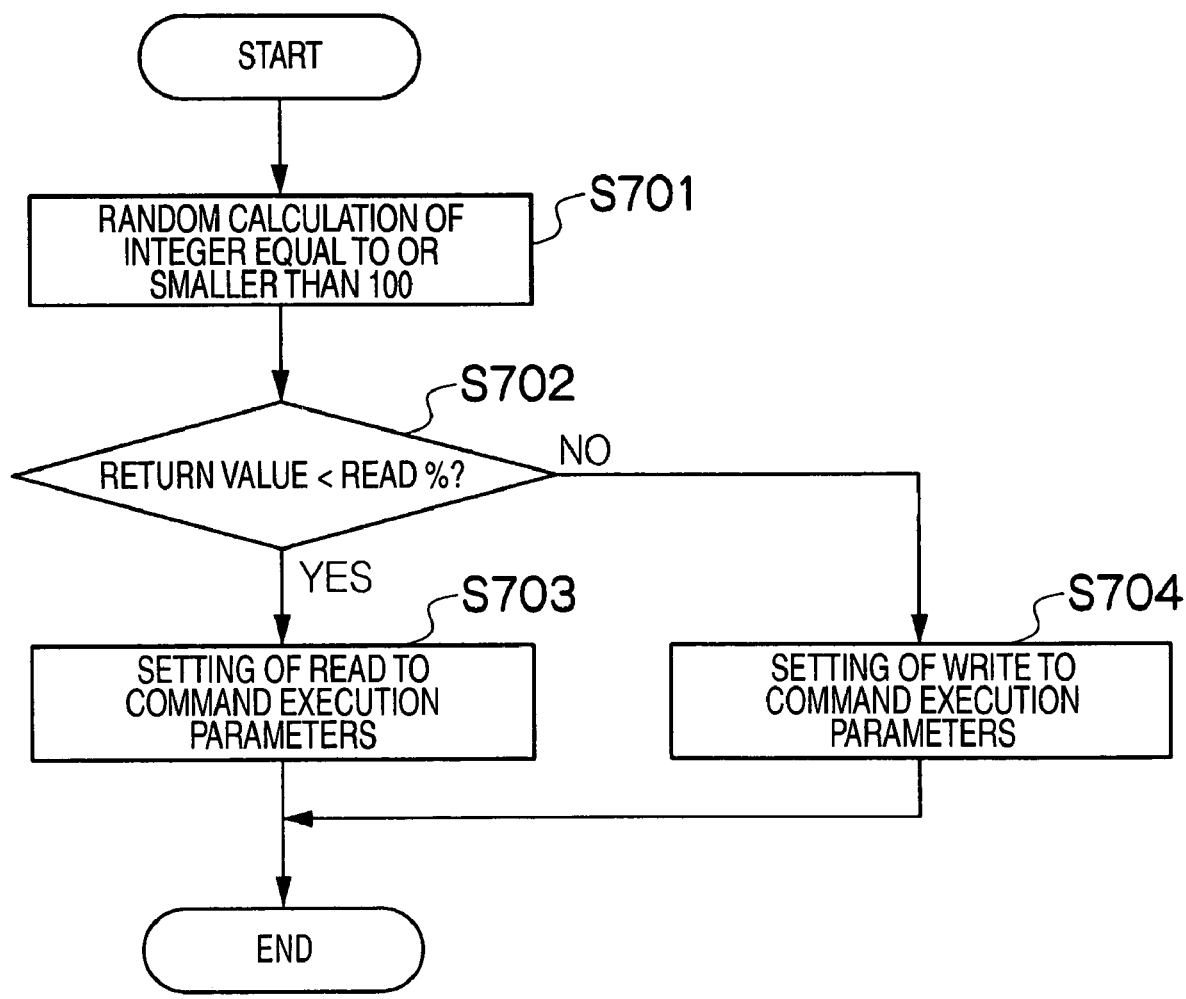
FIG. 17 is a flowchart of a read/write determination process of the embodiment.

FIG. 17 is a flowchart of the read/write determination process in step S504. In step S701, any integer equal to or smaller than 100 is calculated at random. In step S702, a calculation is made whether "return value<read %".

When the determination result in step S702 is YES, the command execution parameters are set with Read in step S703. When the determination result in step S702 is NO, the command execution parameters are set with Write in step S704. After the setting with Read or Write as such, this is the end of the process.

Figure 18:
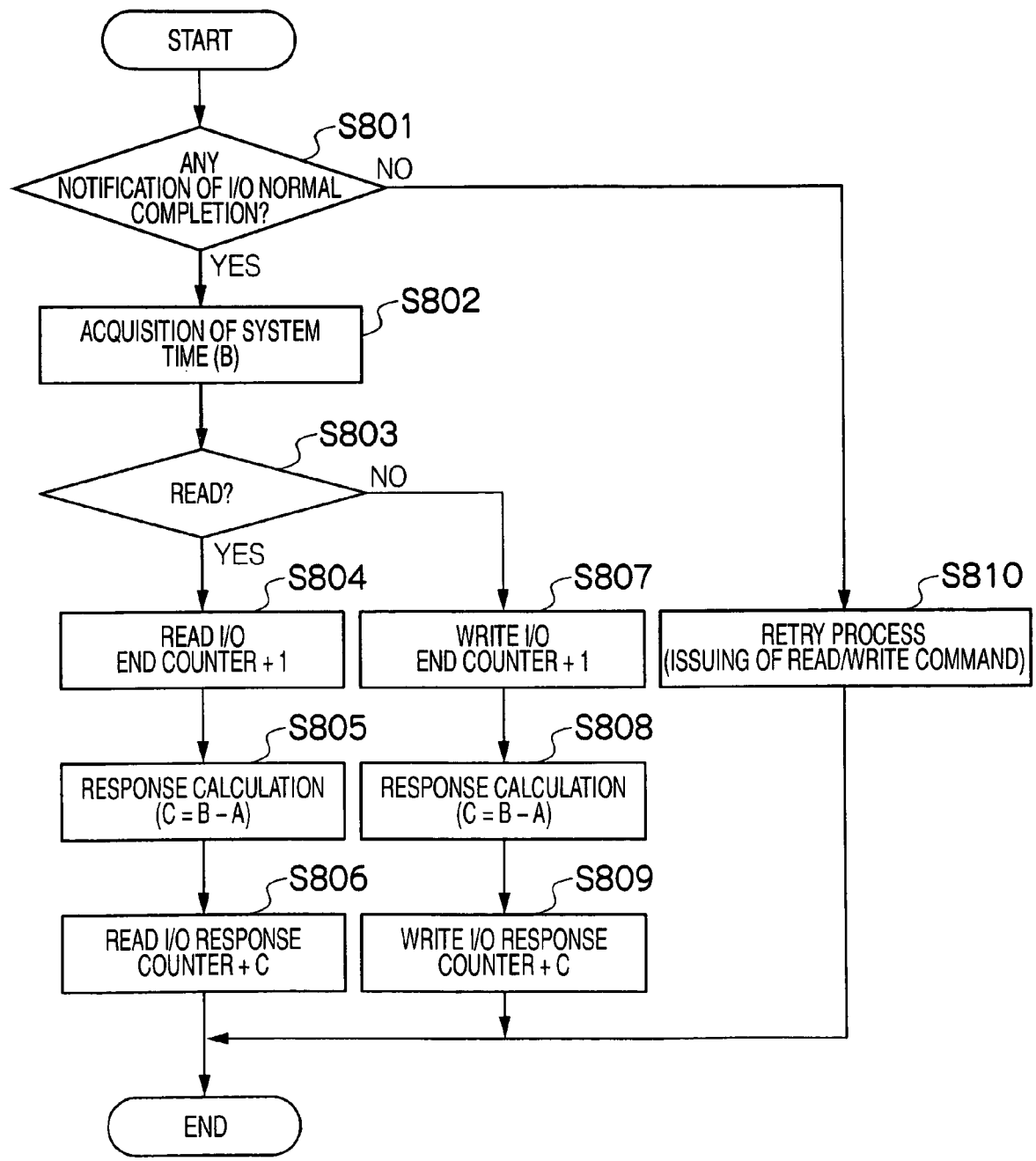
FIG. 18 is a flowchart of a performance measurement process of the embodiment.

FIG. 18 is a flowchart of the performance measurement process in step S507. In step S801, a determination is made whether there is any notification about I/O normal completion. If there is such a notification (S801:YES), a system time (B) is acquired in step S802. Then in step S803, a determination is made whether it is Read or not.

When the determination result in step S803 is YES, the read I/O completion counter is added with "1" in step S804, and in step S805, a response calculation (C=B−A) is made. Then in step S806, the read I/C response counter is added with "C".

When the determination result in step S803 is NO, the write I/O completion count is added with "1" in step S807, and in step S808, a response calculation (C=B−A) is made. Then in step S809, the write I/O counter response counter is added with "C".

On the other hand, when the determination result is NO in step S801, a retry process is executed in step S810, i.e., a read/write command issuing.

With such a procedure, even if the storage device 100 is connected with a plurality of host devices, the performance measurement of the storage device 100 can be performed for every default-set parameter, for every user-designated parameter, or for every LU when there is any change in the configuration information of the storage device 100.

Note that, in the above embodiment, exemplified is the case where the invention is applied to the storage system in which the storage device 100 has a one-to-one relationship with the maintenance terminal 200, but this is surely not restrictive, and the invention can be applied to any other configuration.

For example, as shown in FIG. 19, the invention may be applied to a storage system 2 including the storage system 1 configured by the storage device 100 and the maintenance terminal 200, and a storage system 1 configured by the storage device 100 and the maintenance terminal 200. In such a storage system 2, the maintenance terminal 200 in the storage system 1 may measure the performance of the storage device 100 in the storage system 1', and the maintenance terminal 200 in the storage system 1' may measure the performance of the storage device 100 in the storage system 1.

The aspects of the invention can be applied widely to a storage system and a performance measurement method therefor.

What is claimed is:

1. A storage system including a storage device, a maintenance terminal for maintenance use of the storage device, and a plurality of host devices with respect to the storage device, wherein
    the maintenance terminal includes a setting section that sets information for use to measure performance of the storage device, and
    the storage device includes:
    at least one disk drive;
    a plurality of volumes that are provided by the at least one disk drive, and each store therein data written by the plurality of host devices;
    a detection section that detects any change made to information about a configuration of the storage system that includes at least one of an update of a program stored in the storage device or a paired combination among the plurality of volumes;
    a measurement section that acquires, when the change of the configuration is detected by the detection section, the information set by the setting section, and based on the information, measures the performance of the storage device with respect to the data stored in the plurality of volumes; and
    a transmission section that transmits, to the maintenance terminal, performance information about the performance being a measurement result by the measurement section.

2. The storage system according to claim 1, wherein the information set by the setting section includes information for designating any of the plurality of volumes as a measurement target.

3. The storage system according to claim 2, wherein the performance of the storage device includes reading of the data stored in the volume being the measurement target by the plurality of host devices, and writing of the data to the volume being the measurement target by the plurality of host devices, or includes either the reading or the writing.

4. The storage system according to claim 1, wherein the maintenance terminal includes a display device, and setting details of the information by the setting section are acquired based on an input by a user made in accordance with a screen of the display device, and the performance information provided by the transmission section is displayed on the display device.

5. The storage system according to claim 4, wherein based on a command issued by the user, the maintenance terminal closes the screen for the setting of the information after transmission of the information to the storage device, and after display of a message notifying measurement completion of the performance on the screen, displays the performance information on the display device based on a command issued by the user.

6. The storage system according to claim 1, wherein the information to be set by the setting section is either first information with default-set parameters or second information with user-designated parameters.

7. A performance measurement method of a storage system including a storage device, a maintenance terminal for maintenance use of the storage device, and a plurality of host devices with respect to the storage device, wherein
the storage device includes:
at least one disk drive; and
a plurality of volumes that are provided by the at least one disk drive, and each store therein data written by the plurality of host devices, the method comprising:
setting, by the maintenance terminal, information for use to measure performance of the storage device;
detecting any change made to information about a configuration of the storage system that includes at least one of an update of aerogram stored in the storage device or a paired combination among the plurality of volumes; and
upon a change of the configuration being detected, acquiring, by the storage device, the set information;
measuring the performance of the storage device with respect to the data stored in the plurality of volumes based on the set information; and
transmitting, to the maintenance terminal, performance information about the performance being a measurement result.

* * * * *